US011908648B2

(12) United States Patent
Hotta et al.

(10) Patent No.: US 11,908,648 B2
(45) Date of Patent: Feb. 20, 2024

(54) SWITCH CONFIGURED TO FORM MAGNETIC FIELDS RELATIVE TO CONTACT POINTS

(71) Applicant: Mitsubishi Electric Corporation, Tokyo (JP)

(72) Inventors: Katsuki Hotta, Tokyo (JP); Shinya Watanabe, Tokyo (JP); Takashi Inaguchi, Tokyo (JP); Katsutoshi Ikarashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 9 days.

(21) Appl. No.: 17/777,620

(22) PCT Filed: Dec. 2, 2020

(86) PCT No.: PCT/JP2020/044836

§ 371 (c)(1),
(2) Date: May 18, 2022

(87) PCT Pub. No.: WO2021/149361

PCT Pub. Date: Jul. 29, 2021

(65) Prior Publication Data

US 2022/0415596 A1 Dec. 29, 2022

(30) Foreign Application Priority Data

Jan. 23, 2020 (JP) ................................ 2020-008862

(51) Int. Cl.
*H01H 50/38* (2006.01)
*H01H 50/60* (2006.01)

(52) U.S. Cl.
CPC ............ *H01H 50/38* (2013.01); *H01H 50/60* (2013.01)

(58) Field of Classification Search
CPC ............................... H01H 50/38; H01H 50/60
See application file for complete search history.

(56) References Cited

U.S. PATENT DOCUMENTS 8,653,691 B2 * 2/2014 Hsu ........................ H01H 50/36 335/125
8,853,585 B2 10/2014 Tachikawa et al.
(Continued)

FOREIGN PATENT DOCUMENTS

JP 2011-204478 A 10/2011
JP 2012-160427 A 8/2012
JP 2012160427 A * 8/2012 ........... H01H 50/546

OTHER PUBLICATIONS

International Search Report and Written Opinion dated Feb. 16, 2021, received for PCT Application PCT/JP2020/044836, Filed on Dec. 2, 2020, 8 pages including English Translation.

*Primary Examiner* — Bernard Rojas
(74) *Attorney, Agent, or Firm* — XSENSUS LLP

(57) ABSTRACT

A switch includes: a first stationary contact having a first stationary contact point; a second stationary contact having a second stationary contact point; a movable contact having a first movable contact, and a second movable contact point; a first magnet pair defined by magnets having surfaces facing each other, the magnets of the first magnet pair being disposed with the first stationary contact point and the first movable contact point therebetween in such a manner that the magnets of the first magnet pair become farther from each other outwardly; and a second magnet pair defined by magnets having surfaces facing each other, the magnets of the second magnet pair being disposed with the second stationary contact point and the second movable contact point therebetween in such a manner that the magnets of the second magnet pair become farther from each other outwardly.

14 Claims, 13 Drawing Sheets

(56) References Cited

U.S. PATENT DOCUMENTS

| | | | | |
|---|---|---|---|---|
| 8,937,518 | B2 * | 1/2015 | Suzuki | H01H 9/443 335/131 |
| 9,087,655 | B2 | 7/2015 | Enomoto et al. | |
| 2012/0175345 | A1 * | 7/2012 | Tachikawa | H01H 9/443 218/26 |
| 2022/0293379 | A1 * | 9/2022 | Park | H01H 50/02 |

* cited by examiner

SWITCH CONFIGURED TO FORM MAGNETIC FIELDS RELATIVE TO CONTACT POINTS

CROSS-REFERENCE TO RELATED APPLICATIONS

The present application is based on PCT filing PCT/JP2020/044836, filed Dec. 2, 2020, which claims priority to JP 2020-008862, filed Jan. 23, 2020, the entire contents of each are incorporated herein by reference.

FIELD

The present disclosure relates to a switch that forms magnetic fields near contact points between movable contact points and stationary contact points.

BACKGROUND

Switches include stationary contacts having stationary contact points, and movable contacts having movable contact points movable into and out of contact with the stationary contact points. Arc may occur upon the break of the circuit with the movable contact points away from the stationary contact points. Near the contact points at which such arcs occur are provided permanent magnets that generate magnetic fields to drive the arcs under Lorentz force, such that the arcs are extended, which improves the arc extinguishing performance of the switch (refer to Patent Literature 1, for example).

CITATION LIST

Patent Literature

Patent Literature 1: Japanese Patent Application Laid-open No. 2012-160427

SUMMARY

Technical Problem

In the case of increasing the magnetic flux densities near the contact points so as to increase the driving force for extending the arcs, unfortunately, the permanent magnets need to be closer to the contact points, which causes the problem of failure to form arc extinguishing spaces.

The present disclosure has been made to solve the aforementioned problem, and an object thereof is to provide a switch capable of increasing driving force that acts on arcs and forming arc extinguishing spaces into which the arcs are drawn, as well, thereby increasing arc extinguishing performance.

Solution to Problem

A switch according to the present disclosure comprises: a first stationary contact having a first stationary contact point; a second stationary contact having a second stationary contact point, the second stationary contact point being disposed away from the first stationary contact; a movable contact having a first movable contact point capable of coming into and out of contact with the first stationary contact point, and a second movable contact point capable of coming into and out of contact with the second stationary contact point, the first movable contact point being at one end of the movable contact in a longitudinal direction of the movable contact, the second movable contact point being at another end of the movable contact in the longitudinal direction of the movable contact; a first magnet pair defined by a pair of magnets having surfaces of the same poles facing each other in a lateral direction of the movable contact, the magnets including midpoint sides located toward a midpoint between the first movable contact point and the second movable contact point and in a proximity of the movable contact, the magnets of the first magnet pair being disposed with the first stationary contact point and the first movable contact point therebetween in such a manner that the magnets of the first magnet pair become farther from each other outwardly; and a second magnet pair defined by a pair of magnets having surfaces of the same poles facing each other in the lateral short direction, the magnets of the second magnet pair including midpoint sides located toward the midpoint and in a proximity of the movable contact, the magnets of the second magnet pair being disposed with the second stationary contact point and the second movable contact point therebetween in such a manner that the magnets of the second magnet pair become farther from each other outwardly.

Advantageous Effects of Invention

According to the present disclosure, it becomes possible to increase the driving force that acts on arcs and form the arc extinguishing spaces, which can improve the arc extinguishing performance.

DESCRIPTION OF EMBODIMENTS

First Embodiment

A first embodiment will now be described with reference to the drawings.

Figure 1:
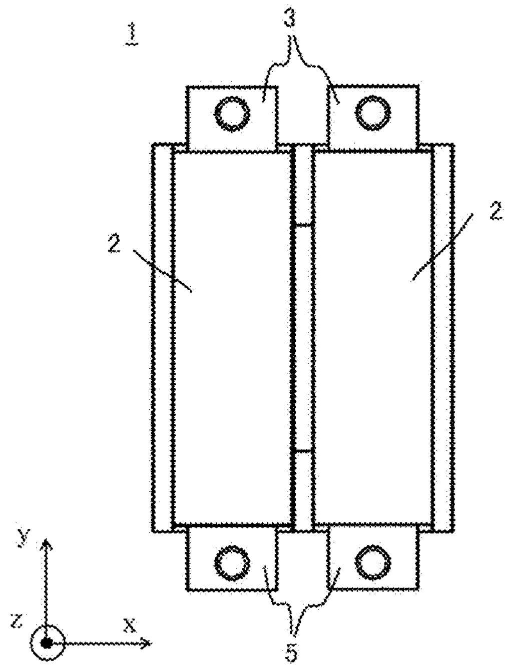
FIG. 1 is a top plan view of a switch according to a first embodiment.

FIG. 1 is a top plan view illustrating an external view of a switch 1 according to the first embodiment. The switch 1 of the present disclosure is an electromagnetic contactor, for example, that makes and breaks a circuit connected with the switch 1. The switch 1 includes arc extinguishing chambers 2 enclosed by arc extinguishing cases. The arc extinguishing chambers 2 of the switch 1 are of a first phase and a second phase separate from each other, and have identical structures.

Figure 2:
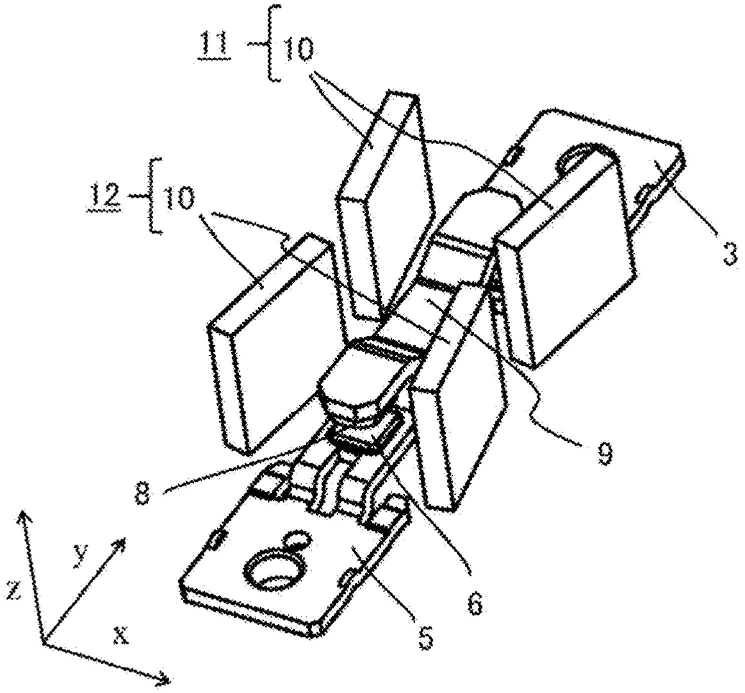
FIG. 2 is a perspective view illustrating a structure of an arc extinguishing chamber of the switch according to the first embodiment.
Figure 3:
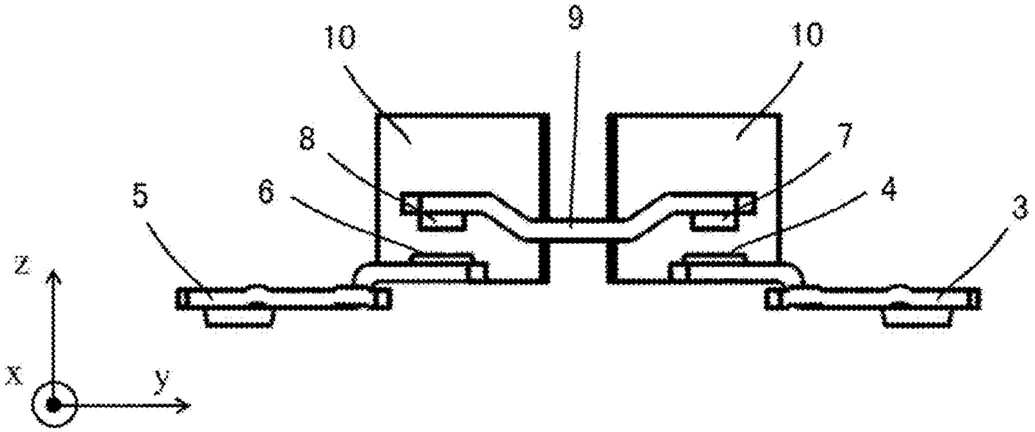
FIG. 3 is a side view illustrating the structure of the arc extinguishing chamber of the switch according to the first embodiment.

FIGS. 2 and 3 are a perspective view and a side view, respectively, illustrating the inside of one arc extinguishing chamber 2 of the switch 1. The switch 1 according to the first embodiment includes first stationary contacts 3, second stationary contacts 5, movable contacts 9, first magnet pairs 11, and second magnet pairs 12. Each of the stationary contacts 3 has a first stationary contact point 4. The second stationary contacts 5 are disposed away from the first stationary contacts 3, and each have a second stationary contact point 6. Each of the movable contacts 9 has a first movable contact point 7 and a second movable contact point 8 at ends thereof in the longitudinal direction (the y-axis direction in FIG. 2). The first movable contact point 7 and the second movable contact point 8 are capable of coming into and out of contact with the first stationary contact point 4 and the second stationary contact point 6, respectively. Each of the first magnet pairs 11 and the second magnet pairs 12 is defined by a pair of magnets 10 that face each other in lateral direction of the movable contact 9 (the x-axis direction in FIG. 2). The pair of magnets 10 is each disposed at an angle relative to the movable contact 9.

The first stationary contact 3 has a substantially rectangular parallelepiped shape, for example, with the first stationary contact point 4 on a main surface thereof (a surface facing in the z-axis positive direction in FIG. 3). As in the first stationary contact 3, the second stationary contact 5 has a substantially rectangular parallelepiped shape, for example, with the second stationary contact point 6 on a main surface thereof. The first stationary contact 3 and the second stationary contact 5, which have identical shapes, are disposed away from each other and allow current to flow through the contacts 3, 5 in opposite directions. In the example of FIG. 3, the stationary contacts are disposed away from each other in the y-axis direction such that the stationary contacts are electrically insulated, and the first stationary contact 3 is located on the y-axis positive side relative to the second stationary contact 5.

When the first stationary contact 3 and the second stationary contact 5 are electrically connected with each other via the movable contact 9 by the operation of the movable contact 9, current flows therethrough, and devices connected with the stationary contacts come into connection with each other to thereby form a circuit. For example, the first stationary contact 3 is connected with a power supply, and the second stationary contact 5 is connected with a load such as a motor.

The movable contact 9 has a substantially rectangular shape as view in top plan (as viewed downward in the z-axis negative direction in FIG. 3), for example. The movable contact 9 has the first movable contact point 7 and the second movable contact point 8 provided at the longitudinal ends thereof. The first movable contact point 7 and the second movable contact point 8 are capable of coming into and away from contact with the first stationary contact point 4 and the second stationary contact point 6, respectively. Note that the first stationary contact point 4 and the first movable contact point 7 are disposed facing each other, and similarly, the second stationary contact point 6 and the second movable contact point 8 are disposed facing each other. Thus, the first movable contact point 7 is provided on the side on which the first stationary contact point 4 is located, and the second movable contact point 8 is provided on the opposite side to the side on which the first movable contact point 7 is provided. On such an opposite side is located the second stationary contact point 6.

In addition, the movable contact 9, which is connected with a driving device (not illustrated) using an electromagnet etc., for example, is movable in the vertical direction (the z-axis direction in FIG. 3). The movement of the movable contact 9 in the vertical direction onto and away from the stationary contact points brings each of the movable contact points into and out of contact with the corresponding one of the stationary contact points. The individual contacts and contact points are electrically conductive. For example, the individual contacts are made of copper or a copper alloy, and the individual contact points are made of silver or an alloy containing silver as a base material.

When the individual movable contact point and the corresponding stationary contact point in contact with each other allowing a flow of current therethrough are separated from each other, high-temperature arcs are produced between the contact points depending on a circuit condition. Because an arc, which is electrically conductive, causes a current flow, an arc needs to be extinguished for interruption of an electric circuit. Immediate extinguishment of an arc can completely interrupt circuit current and prevent current from flowing to a load connected with the switch 1.

Figure 4:
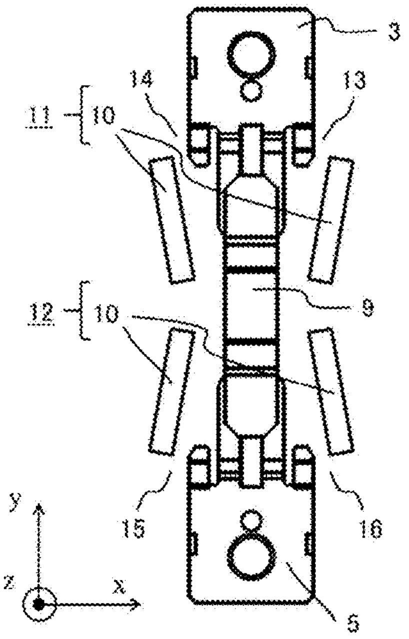
FIG. 4 is a top plan view illustrating the structure of the arc extinguishing chamber of the switch according to the first embodiment.

Next, a first magnet pair 11 and a second magnet pair 12 of the switch 1 will be described with reference to FIG. 4. The first magnet pair 11 is disposed so that the first stationary contact point 4 and the first movable contact point 7 of the movable contact 9 are disposed between the magnets 10 having their individual surfaces of the same poles facing each other in the lateral direction of the movable contact 9. The magnets 10 defining the first magnet pair 11 are plate-like permanent magnets, for example, and are disposed on the side of the first movable contact point 7 relative to the longitudinal midpoint of the movable contact 9. In the example of FIG. 4, each of the magnets 10 is a single permanent magnet. The permanent magnet may be divided into a plurality of magnets. Note that the midpoint of the movable contact 9 is a position that equally divides the distance between the first movable contact point 7 and the second movable contact point 8.

The magnets 10 of the first magnet pair 11 includes midpoint sides located toward the longitudinal midpoint of the movable contact 9 and in a proximity of the movable contact 9. The magnets 10 of the first magnet pair 11 are disposed with the first stationary contact point 4 and the first movable contact point 7 therebetween in such a manner that the surfaces of the magnets 10 facing each other define a smaller distance therebetween on the midpoint sides of the magnets 10. That is, the magnets 10 of the first magnet pair 11 include second movable contact point sides located toward the second movable contact point 8, and first movable contact point sides located toward first movable contact point 7 (the y-axis negative direction in FIG. 4). The second movable contact point sides are closer to the movable contact 9 than the first movable contact point sides are. The magnets 10 of the first magnet pair 11 are disposed with the first stationary contact point 4 and the first movable contact point 7 therebetween in such a manner that the magnets 10 become farther from each other toward the outer side of the movable contact 9.

Such a disposition of the first magnet pair 11 forms arc extinguishing spaces obliquely outwardly from the first movable contact point 7, such an arc produced between the first stationary contact point 4 and the first movable contact point 7 is drawn into the arc extinguishing spaces. Hereinafter, an arc extinguishing space outside the first movable contact point 7 in the x-axis positive direction and the y-axis positive direction will be referred to as a first arc extinguishing space 13. An arc extinguishing space outside the first movable contact point 7 in the x-axis negative direction and the y-axis positive direction will be referred to as a second arc extinguishing space 14.

As in the first magnet pair 11, the second magnet pair 12 is disposed so that the second stationary contact point 6 and the second movable contact point 8 of the movable contact 9 are disposed between the magnets 10 having their surfaces of the same poles facing each other in the lateral direction of the movable contact 9. The magnets 10 defining the second magnet pair 12 are disposed on the side of the second movable contact point 8 relative to the longitudinal midpoint of the movable contact 9.

The magnets 10 of the second magnet pair 12 includes midpoint sides located toward the longitudinal midpoint of the movable contact 9 and in a proximity of the movable contact 9. The magnets 10 are disposed with the second stationary contact point 6 and the second movable contact point 8 therebetween in such a manner that the surfaces of the magnets 10 facing each other define a smaller distance therebetween on the midpoint sides of the magnets 10. That is, the magnets 10 of the second magnet pair 12 include second movable contact point sides located toward the second movable contact point 8, and first movable contact point sides located toward first movable contact point 7 (the y-axis positive direction in FIG. 4). The first movable contact point sides are closer to the movable contact 9 than the second movable contact point sides are. The magnets 10 of the second magnet pair 12 are disposed with the second stationary contact point 6 and the second movable contact point 8 therebetween in such a manner that the magnets 10 become farther from each other toward the outer side of the movable contact 9.

Such a disposition of the second magnet pair 12 forms arc extinguishing spaces obliquely outwardly from the second movable contact point 8, such an arc produced between the second stationary contact point 6 and the second movable contact point 8 is drawn into the arc extinguishing spaces. Hereinafter, an arc extinguishing space outside the second movable contact point 8 in the x-axis negative direction and the y-axis negative direction will be referred to as a third arc extinguishing space 15. An arc extinguishing space outside the second movable contact point 8 in the x-axis positive direction and the y-axis negative direction will be referred to as a fourth arc extinguishing space 16. The first magnet pair 11 and the second magnet pair 12 are preferably arranged substantially symmetrically.

Note that the magnets 10 defining the first magnet pair 11 and the magnets 10 defining the second magnet pair 12 may have a height within the arc extinguishing chamber 2, and preferably a height larger than contact gaps formed between the stationary contact points and the movable contact points. When the magnets 10 have a height approximately equal to the contact gaps, magnetic flux generated by the magnets 10 can efficiently pass through the contact gaps caused by arcs. In addition, the magnets 10 of the magnet pairs preferably have similar shapes and are disposed linearly symmetrically with respect to an axis on the longitudinally extending center of the movable contact 9. This prevents magnetic fields near the contact points from being biased, thereby preventing the occurrence of a difference in the directions in which arcs are drawn depending on the direction of current.

The oblique disposition of the first magnet pair 11 and the second magnet pair 12 can place the magnets 10 closer to the movable contact 9 and enhance the magnetic fields near the contact points as compared with a case where the magnets 10 are arranged parallel to the movable contact 9. Furthermore, because the arc extinguishing spaces allowing arcs to be drawn obliquely outward from the movable contact points are provided, the arc extinguishing performance of the switch 1 can be improved. In addition, the magnets 10 of the magnet pairs disposed as described above are open toward the arc extinguishing spaces, such that arcs are less affected by magnetic fields that can hinder the draw of arcs as the magnetic fields outside the magnets 10 extend in the longitudinal direction of the movable contact 9 and around the magnets 10. In addition, because the surfaces of the magnets 10 facing each other have the same magnetic poles and the magnets 10 produce magnetic field distribution that is linearly symmetric with respect to the center of the movable contact 9, the aforementioned effects can be produced regardless of the direction in which current flows through the movable contact 9.

Figure 5:
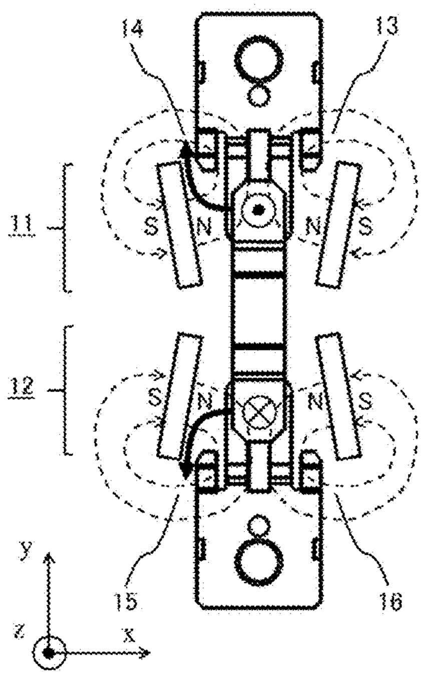
FIG. 5 is a schematic diagram schematically illustrating magnetic fields produced at the arc extinguishing chamber of the switch according to the first embodiment.

Next, driving force that acts on arcs will be explained with reference to FIG. 5 showing an example in which the magnets 10 of each of the first magnet pair 11 and the second magnet pair 12 are each disposed at an angle relative to the movable contact 9 and have their surfaces of N poles facing each other.

When an arc providing a flow of current in the z-axis positive direction is produced between the first stationary contact point 4 and the first movable contact point 7, the arc is drawn in the x-axis negative direction by the y-axis components of magnetic fields (broken lines in FIG. 5) formed near the contact points by the first magnet pair 11. Furthermore, this arc is drawn in the y-axis positive direction by the x-axis component of the magnetic field formed near the contact points by the magnet 10 on the left in FIG. 5 (on the x-axis negative side) of the first magnet pair 11. As a result, the arc is then drawn toward the second arc extinguishing space 14 (a thick line arrow in FIG. 5).

An arc is drawn by the second magnet pair 12 as in the case of the first magnet pair 11. When an arc providing a flow of current in the z-axis negative direction is produced between the second stationary contact point 6 and the second movable contact point 8, the arc is drawn in the x-axis negative direction by the y-axis components of magnetic fields (broken lines in FIG. 5) formed near the contact points by the second magnet pair 12. Furthermore, this arc is drawn in the y-axis negative direction by the x-axis component of the magnetic field formed near the contact points by the magnet 10 on the left in FIG. 5 (on the x-axis positive side) of the second magnet pair 12. As a result, the arc is then drawn toward the third arc extinguishing space 15 (a thick line arrow in FIG. 5). Note that, in the present embodiment, when the direction in which current flows through the movable contact 9 is reversed, that is, when an arc providing a flow of current in the z-axis negative direction is produced between the first stationary contact point 4 and the first movable contact point 7 and an arc providing a flow of current in the z-axis positive direction is produced between the second stationary contact point 6 and the second movable contact point 8, the arc produced between the first stationary contact point 4 and the first movable contact point 7 is drawn into the first arc extinguishing space 13 and the arc produced between the second stationary contact point 6 and the second movable contact point 8 is drawn into the fourth arc extinguishing space 16 by similar effects of the magnetic fields.

Figure 6:
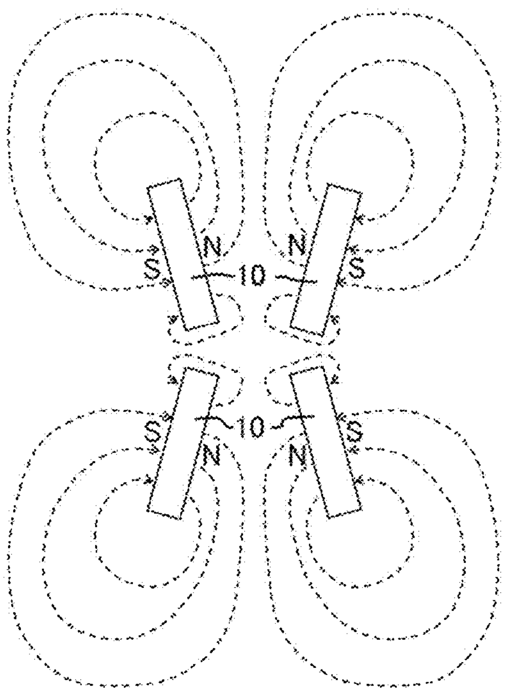
FIG. 6 is a schematic diagram schematically illustrating magnetic fields according to the first embodiment.
Figure 7:
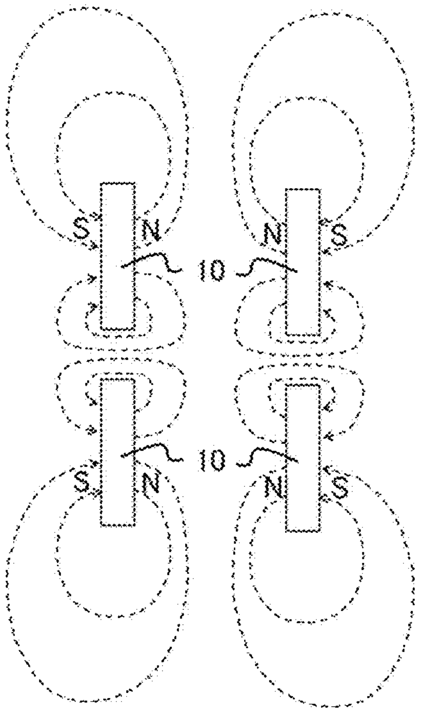
FIG. 7 is a schematic diagram schematically illustrating magnetic fields according to the first embodiment.

In addition, the magnets 10 disposed in such a manner that the distance between the surfaces thereof facing each other becomes smaller toward the midpoint of the movable contact 9, as illustrated in FIG. 6, makes more magnetic flux concentrate near the contact points than the magnets 10 disposed in parallel as illustrated in FIG. 7. As described above, because the magnets of the magnet pairs disposed as illustrated in FIG. 6 provide the larger y-axis components than the parallel-disposed magnets of the magnet pairs, the driving force in the x-axis direction that acts on the arcs can be increased. Furthermore, the first magnet pair 11 and the second magnet pair 12 are disposed in such a manner that the distance between the surfaces of the first magnet pair 11 facing each other become wider in the y-axis positive direction and the distance between the surfaces of the second magnet pair 12 facing each other become wider in the y-axis negative direction. That is, the first magnet pair 11 and the second magnet pair 12 are disposed in such a manner that the magnets of the first magnet pair 11 are disposed obliquely outward in the y-axis positive direction, and the magnets of the second magnet pair 12 are disposed obliquely outward in the y-axis negative direction. As a result, the influence of the magnetic fields that involve the arcs at the outer ends of the magnet pairs can be reduced. This can prevent the magnetic fields developing around the magnets 10 at the outer ends from hindering the draw of arcs.

Note that the angles between the magnet pairs and the axis of the movable contact 9 in the longitudinal direction, that is, the angle between the magnet 10 defining each magnet pair and the y axis as viewed in top plan may be larger than 0° and smaller than 90°. With the view to reducing the size of the arc extinguishing chamber 2, the angle is preferably equal to or larger than 5° and equal to or smaller than 45°. For the purpose of achieving more effective draw of arcs, the angle is preferably equal to or larger than 15° and equal to or smaller than 30° where the magnetic fields concentrate near the contact points. The angles of the first magnet pair 11 and the second magnet pair 12 are preferably equal to each other, but are not limited thereto and may be different from each other within the range in which the effects are produced.

As described above, the first stationary contact 3 has the first stationary contact point 4. The second stationary contact 5 has the second stationary contact point 6. The movable contact 9 has the first movable contact point 7 and the second movable contact point 8 at the longitudinal opposite ends thereof. The first movable contact point 7 and the second movable contact point 8 are capable of coming into and out of contact with the first stationary contact point 4 and the second stationary contact point 6. The first magnet pair 11 and the second magnet pair 12 each include the magnets 10 having the surfaces of the same poles facing each other with the movable contact 9 therebetween. The magnets 10 of the first magnet pair 11 are disposed in such a manner as to become closer to each other toward the midpoint of the movable contact 9. The magnets 10 of the second magnet pair 12, which is on the side of the second movable contact point 8 relative to the first magnet pair 11, are disposed in such a manner as to become closer to each other toward the midpoint of the movable contact 9. Such an arrangement enables the magnet fields to concentrate near the contact points to increase the driving force that acts on the arcs, and forms the arc extinguishing spaces 13 to 16 as well, thereby improving the arc extinguishing performance.

The present embodiment is described giving the example in which the surfaces of each of the first and second magnet pairs 11 and 12, which face each other, have the N poles, the surfaces facing each other only need to have the same poles, and may have the S poles. Furthermore, the magnetic poles of the surfaces of the first magnet pair 11 facing each other may be different from the magnetic poles of the surfaces of the second magnet pair 12 facing each other. For example, in a case where the magnetic poles of the surfaces of the first magnet pair 11 and the second magnet pair 12 facing each other are the S poles, an arc, which is produced between the first stationary contact point 4 and the first movable contact point 7 and provides a flow of current in the z-axis positive direction, is drawn into the first arc extinguishing space 13. Also, an arc, which is produced between the second stationary contact point 6 and the second movable contact point 8 and provides a flow of current in the z-axis negative direction, is drawn into the fourth arc extinguishing space 16.

Second Embodiment

Figure 8:
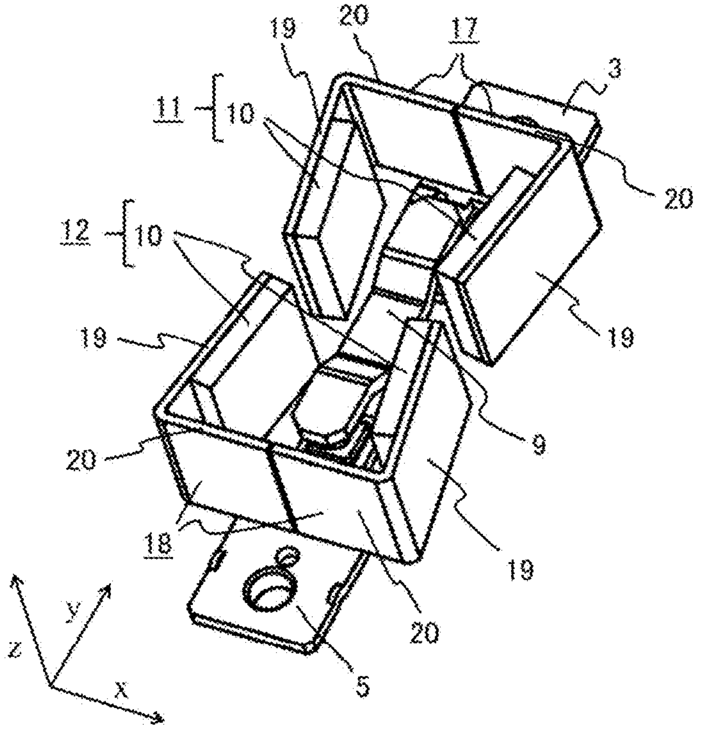
FIG. 8 is a perspective view illustrating a structure of an arc extinguishing chamber of a switch according to a second embodiment.
Figure 9:
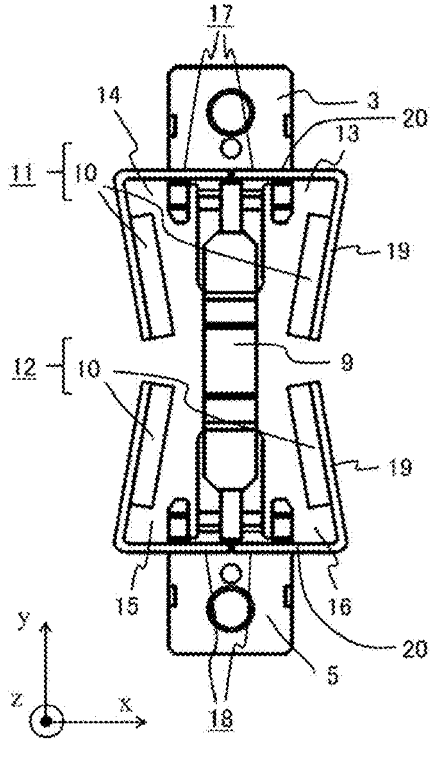
FIG. 9 is a top plan view illustrating the structure of the arc extinguishing chamber of the switch according to the second embodiment.

FIGS. 8 and 9 are a perspective view and a top plan view, respectively, illustrating the inside of an arc extinguishing chamber 2 of a switch 1 according to a second embodiment. As in the first embodiment, the switch 1 according to the second embodiment includes: a first stationary contact 3 having a first stationary contact point 4; a second stationary contact 5 having a second stationary contact point 6; a movable contact 9 having a first movable contact point 7 and a second movable contact point 8, which are capable of coming into and out of contact with the first stationary contact point 4 and the second stationary contact point 6, respectively; and a first magnet pair 11 and a second magnet pair 12 disposed with the movable contact 9 therebetween and each having an angle relative to the movable contact 9. The present embodiment is different in providing a first yoke pair 17 and a second yoke pair 18 connected with the first magnet pair 11 and the second magnet pair 12, respectively. Components that are the same as those in the first embodiment will be represented by the same reference numerals, and description thereof will not be repeated.

The first yoke pair 17 includes connection parts 19 connected with the magnets 10, and magnetic flux inducing parts 20. The magnets 10 of the first magnet pair 11 have back surfaces opposite the surfaces thereof facing each other, and the connection parts 19 are provided on these back surfaces of the magnets 10. The magnetic flux inducing parts 20, which are bent from the connection parts 19 in such a manner as to be closer to the first movable contact point 7, induce magnetic flux from the magnets 10. As in the first yoke pair 17, the second yoke pair 18 includes connection parts 19 connected with the magnets 10, and magnetic flux inducing parts 20. The magnets 10 of the second magnet pair 12 have back surfaces opposite the surfaces thereof facing each other, and the connection parts 19 are provided on these back surfaces of the magnets 10. The magnetic flux inducing parts 20, which are bent from the connection parts 19 in such a manner as to be closer to the second movable contact point 8, induce magnetic flux from the magnets 10. The first yoke pair 17 and the second yoke pair 18 are made of a magnetic material. The yoke pairs define arc extinguishing spaces and induce magnetic flux from the magnets 10 as well, such that each of the yoke pairs forms a magnetic circuit with the corresponding one of the first magnet pair 11 and the second magnet pair 12.

Specifically, the first yoke pair 17 includes first connection parts each connected with the magnet 10 of the first magnet pair 11, and first magnetic flux inducing parts bent from the first connection parts in such a manner as to be closer to the movable contact 9 and located on the longitudinally outer side of the first movable contact point 7. As in the first yoke pair 17, the second yoke pair 18 includes second connection parts each connected with the magnet 10 of the second magnet pair 12, and second magnetic flux inducing parts bent from the second connection parts in such a manner as to be closer to the movable contact 9 and located on the longitudinal outer side of the second movable contact point 8.

As illustrated in the top plan view of FIG. 9, the arc extinguishing spaces are formed at individual L-shaped bent corners of the first yoke pair 17 and the second yoke pair 18. In the example of FIG. 9, the first arc extinguishing space 13 is an arc extinguishing space defined at a corner located in the x-axis positive direction and the y-axis positive direction from the first movable contact point 7. The second arc extinguishing space 14 is an arc extinguishing space defined at a corner located in the x-axis negative direction and the y-axis positive direction from the first movable contact point 7. The third arc extinguishing space 15 is an arc extinguishing space defined at a corner located in the x-axis negative direction and the y-axis negative direction from the second movable contact point 8. The fourth arc extinguishing space 16 is an arc extinguishing space defined at a corner in the x-axis positive direction and the y-axis negative direction from the second movable contact point 8.

Note that the yoke pairs preferably includes the connection parts 19 extending from their positions contacting the magnets 10, and the magnetic flux inducing parts 20 bent and extending in parallel to the x axis so as to define the arc extinguishing spaces. With the yoke pairs thus provided, the magnetic flux produced from the first magnet pair 11 can be induced near the contact point formed by the first stationary contact point 4 and the first movable contact point 7, and the magnetic flux produced from the second magnet pair 12 can be induced near the contact point formed by the second stationary contact point 6 and the second movable contact point 8.

Figure 10:
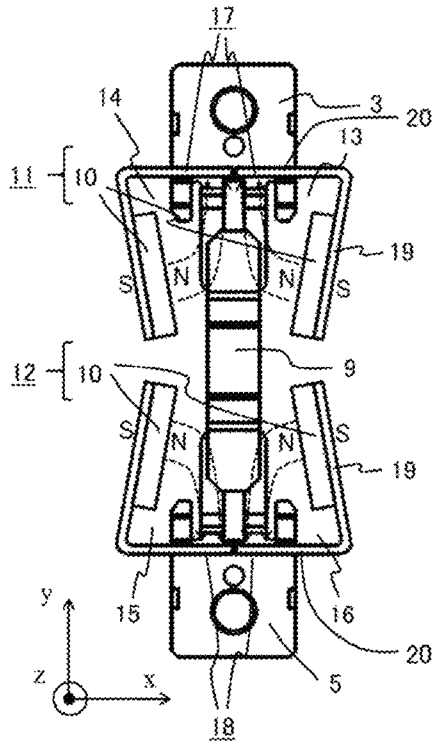
FIG. 10 is a schematic diagram schematically illustrating magnetic fields produced at the arc extinguishing chamber of the switch according to the second embodiment.

FIG. 10 is a schematic diagram of magnetic flux lines (broken lines in FIG. 10) in a case where the switch 1 includes the yoke pairs. In the example of FIG. 10, the faces of the magnet pairs facing each other all have the N poles. As illustrated in FIG. 10, the magnetic fields formed by the individual magnet pairs include magnetic-field components passing near the contact points and having increased components along the movable contact 9 as compared with magnetic fields without the yoke pairs. As a result, arcs are easy to draw into the arc extinguishing spaces arcs as the arcs are less affected by the components of the magnetic fields that develop around the magnets 10, that is, the components of the magnetic fields that draw arcs toward the center of the movable contact 9.

Providing the first yoke pair 17 and the second yoke pair 18, as described above, makes it possible to induce magnetic flux near the contact points and thus enhance the magnetic fields, thereby further improving the arc extinguishing performance.

While the present embodiment is described giving the example in which the magnetic flux inducing parts 20 are parallel to the x axis, the directions in which the magnetic flux inducing parts 20 extend may not be parallel to the x axis. For example, the yoke pairs can be closer to the movable contact 9 to such an extent as not to make it difficult to provide the arc extinguishing spaces. That is, the yoke pairs can be disposed in such a manner as to define acute interior angles between the connection parts 19 and the magnetic flux inducing parts 20. In such a case, the contact points and the yoke pairs are closer to each other, which can make more magnetic flux concentrate near the contact points and make the arc extinguishing chamber 2 smaller in size. Alternatively, for example, the yoke pairs can be farther from the movable contact 9 to such an extent as not to hinder inducing the magnetic flux. That is, the yoke pairs can be disposed in such a manner as to define obtuse interior angles between the connection parts 19 and the magnetic flux inducing parts 20. In such a case, the arc extinguishing spaces can be larger.

While the present embodiment is described giving the example in which the first yoke pair 17 and the second yoke pair 18 are provided separately from each other, the magnetic flux inducing parts 20 of the first yoke pair 17 may be continuously formed, and the magnetic flux inducing parts 20 of the second yoke pair 18 may be continuously formed. In addition, the first yoke pair 17 and the second yoke pair 18 may be integrated together. In this case, the connection parts 19 of the first yoke pair 17 are contiguous and integral with the connection parts 19 of the second yoke pair 18.

Third Embodiment

Figure 11:
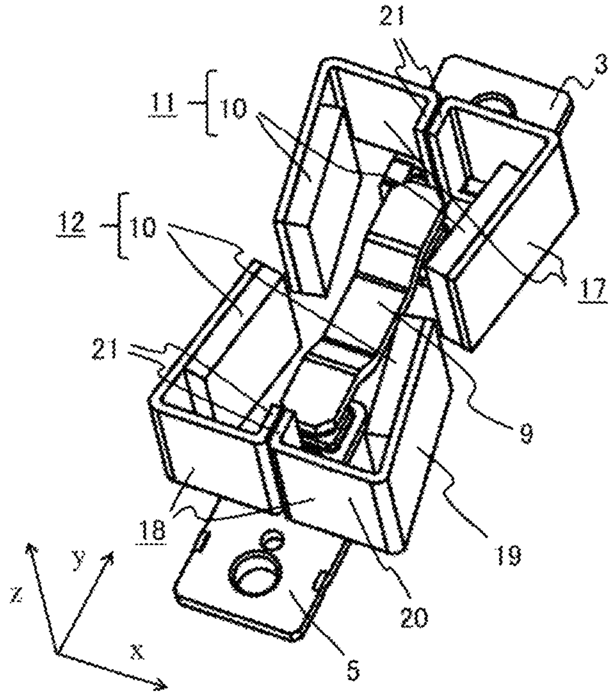
FIG. 11 is a perspective view illustrating a structure of an arc extinguishing chamber of a switch according to a third embodiment.
Figure 12:
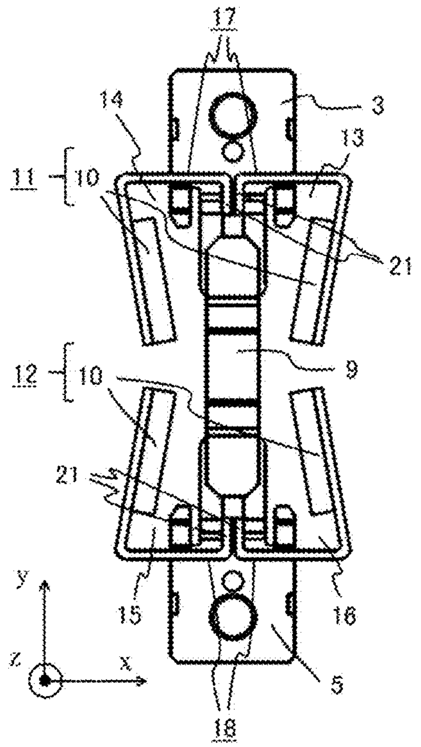
FIG. 12 is a top plan view illustrating the structure of the arc extinguishing chamber of the switch according to the third embodiment.

FIGS. 11 and 12 are a perspective view and a top plan view, respectively, illustrating the inside of an arc extinguishing chamber 2 of a switch 1 according to a third embodiment. As in the first embodiment, the switch 1 according to the present embodiment includes: a first stationary contact 3 having a first stationary contact point 4; a second stationary contact 5 having a second stationary contact point 6; a movable contact 9 having a first movable contact point 7 and a second movable contact point 8, which are capable of coming into and out of contact with the first stationary contact point 4 and the second stationary contact point 6, respectively; and a first magnet pair 11 and a second magnet pair 12 disposed with the movable contact 9 therebetween and each having an angle relative to the movable contact 9. The third embodiment is different in providing a first yoke pair 17 and a second yoke pair 18 connected with the first magnet pair 11 and the second magnet pair 12, respectively, and in providing the first yoke pair 17 and the second yoke pair 18 with protruding portions 21 protruding toward the movable contact 9. Components that are the same as those in the first embodiment will be represented by the same reference numerals, and description thereof will not be repeated.

As illustrated in FIG. 12, the protruding portions 21 formed on the magnetic flux inducing parts 20 of each yoke pair extend toward the movable contact 9. In the example of FIG. 12, the direction in which protruding portions 21 protrude is a direction along the longitudinal direction. The direction in which the protruding portions 21 protrude is preferably parallel to the longitudinal direction. In addition, the protruding portions 21 of the first yoke pair 17 are preferably at positions in the y-axis positive direction from the first movable contact point 7, and the protruding portions 21 of the second yoke pair 18 are preferably at positions in the y-axis negative direction from the second movable contact point 8.

Specifically, the first yoke pair 17 includes first connection parts each connected with the magnet 10 of the first magnet pair 11, and first magnetic flux inducing parts bent from the first connection parts in such a manner as to be closer to the movable contact 9, the first magnetic flux inducing parts being located on the outer side of the first movable contact point 7. The first yoke pair 17 further includes first protruding portions extending closely to the movable contact 9 in the longitudinal direction of the movable contact 9. As in the first yoke pair 17, the second yoke pair 18 includes second connection parts each connected with the magnet 10 of the second magnet pair 12, and second magnetic flux inducing parts bent from the second connection parts in such a manner as to be closer to the movable contact 9, the second magnetic flux inducing parts being located on the outer side of the second movable contact point 8. The the second yoke pair 18 further includes second protruding portions extending closely to the movable contact 9 in the longitudinal direction of the movable contact 9.

Figure 13:
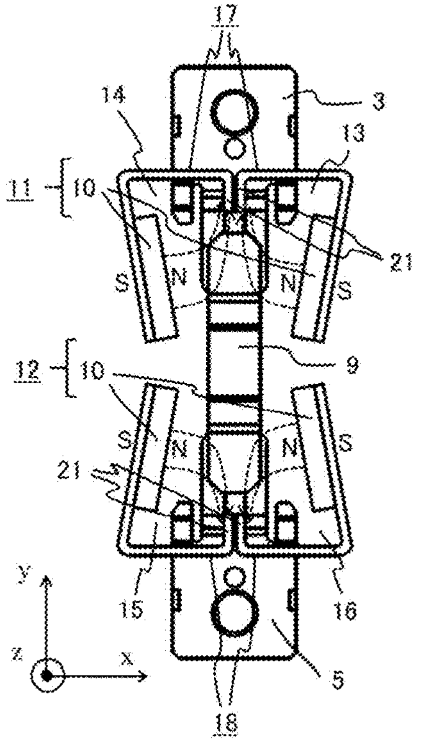
FIG. 13 is a schematic diagram schematically illustrating magnetic fields produced at the arc extinguishing chamber of the switch according to the third embodiment.

Because the first yoke pair 17 and the second yoke pair 18 each include the protruding portions 21 extending closely to the first movable contact point 7 and the second movable contact point 8, respectively, as described above, the magnetic flux can be induced near the contact points as illustrated in the schematic diagram of the magnetic flux lines (broken lines in FIG. 13) in FIG. 13. Thus, the magnetic fields near the contact points can be enhanced, which increases the driving force that acts on the arcs, and improves the arc extinguishing performance.

While the present embodiment is described giving an example in which the protruding portions 21 are formed on each of the first yoke pair 17 and the second yoke pair 18, the protruding portions 21 may be formed on either one of the first yoke pair 17 and the second yoke pair 18.

Fourth Embodiment

Figure 14:
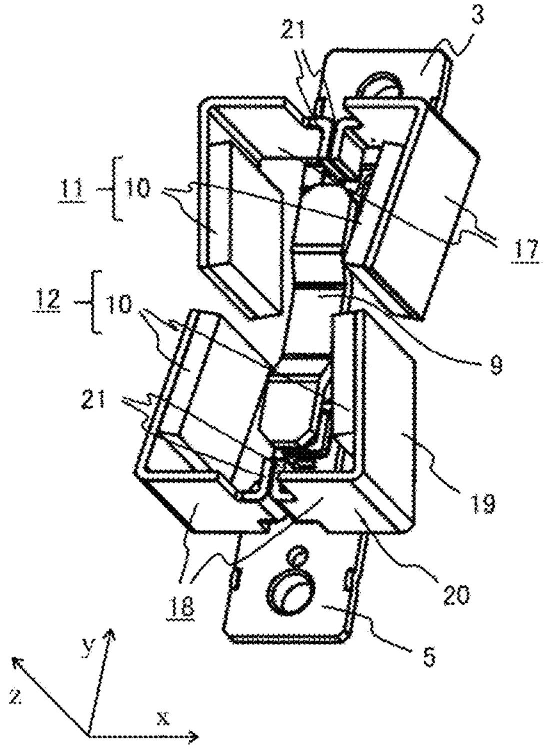
FIG. 14 is a perspective view illustrating a structure of an arc extinguishing chamber of a switch according to a fourth embodiment.
Figure 15:
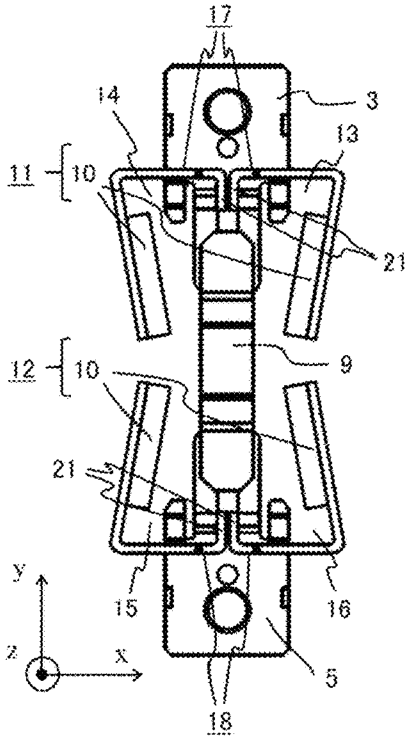
FIG. 15 is a top plan view illustrating the structure of the arc extinguishing chamber of the switch according to the fourth embodiment.

FIGS. 14 and 15 are a perspective view and a top plan view, respectively, illustrating the inside of an arc extinguishing chamber 2 of a switch 1 according to a fourth embodiment. As in the first embodiment, the switch 1 according to the present embodiment includes: a first stationary contact 3 having a first stationary contact point 4; a second stationary contact 5 having a second stationary contact point 6; a movable contact 9 having a first movable contact point 7 and a second movable contact point 8, which are capable of coming into and out of contact with the first stationary contact point 4 and the second stationary contact point 6, respectively; and a first magnet pair 11 and a second magnet pair 12 disposed with the movable contact 9 therebetween and each having an angle relative to the movable contact 9. The present embodiment is different in providing a first yoke pair 17 and a second yoke pair 18 connected with the first magnet pair 11 and the second magnet pair 12, respectively, in providing protruding portions 21 protruding toward the movable contact 9, and further in that the protruding portions 21 have heights approximately equal to contact gaps formed between the contact points. Components that are the same as those in the first embodiment will be represented by the same reference numerals, and description thereof will not be repeated.

As illustrated in FIG. 14, the protruding portions 21 formed on the magnetic flux inducing parts 20 of each yoke pair extend closely to the movable contact 9. Furthermore, the protruding portions 21, which have cutout parts formed adjacent thereto, are formed at a height approximately equal to the contact gaps formed between the contact points. The cutout parts may be formed at least above and/or below the protruding portions 21. In the example of FIG. 14, the cutout parts are formed both above and below the protruding portions 21.

With the view to inducing the magnetic flux, the protruding portions 21 of the first yoke pair 17 are disposed on the longitudinal outer side of the first stationary contact point 4 and the first movable contact point 7 so that the protruding portions 21 are at least partially between the first stationary contact point 4 and the first movable contact point 7 in the height direction of the movable contact 9 when the circuit is broken. Similarly, the protruding portions 21 of the second yoke pair 18 are disposed on the longitudinal outer side of the second stationary contact point 6 and the second movable contact point 8 so that the protruding portions 21 are at least partially between the second stationary contact point 6 and the second movable contact point 8 in the height direction of the movable contact 9 when the circuit is broken. Not that the phrase "when the circuit is broken" refers to when the contact gap between each stationary contact point and the corresponding movable contact point is maximum in the operation of the switch 1.

Because the first yoke pair 17 and the second yoke pair 18 each include the protruding portions 21 extending closely to the first movable contact point 7 and the second movable contact point 8, respectively, and having heights approximately equal to the contact gaps as described above, the magnetic flux can be induced near the contact points and to the contact gaps. Thus, the magnetic flux densities near the contact points and in the contact gaps increase, which increases the driving force that acts on the arcs, and improves the arc extinguishing performance.

In addition, in the example of FIG. 14, the direction in which protruding portions 21 protrude is a direction along the longitudinal direction. The direction in which the protruding portions 21 protrude is preferably parallel to the longitudinal direction. In addition, the protruding portions 21 of the first yoke pair 17 are preferably at positions in the y-axis positive direction from the first movable contact point 7, and the protruding portions 21 of the second yoke pair 18 are preferably at positions in the y-axis negative direction from the second movable contact point 8.

While the protruding portions 21 have heights approximately equal to the contact gaps in the present embodiment, the height may be larger or smaller than the contact gaps to such an extent as to produce the effects.

Fifth Embodiment

Figure 16:
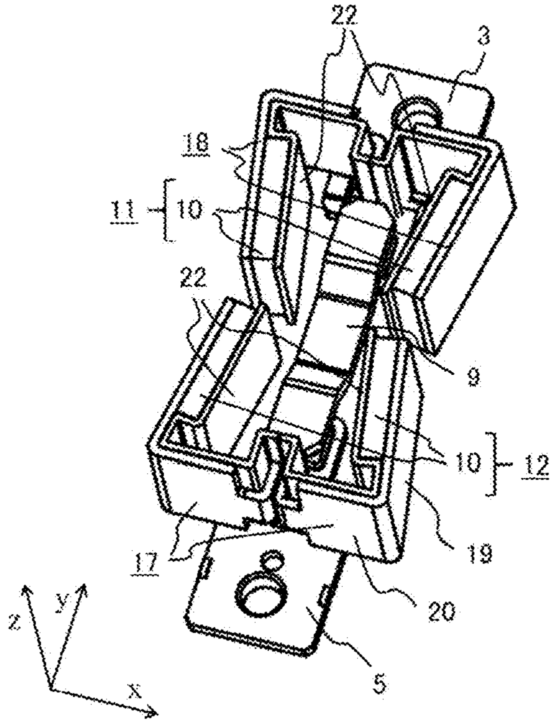
FIG. 16 is a perspective view illustrating a structure of an arc extinguishing chamber of a switch according to a fifth embodiment.
Figure 17:
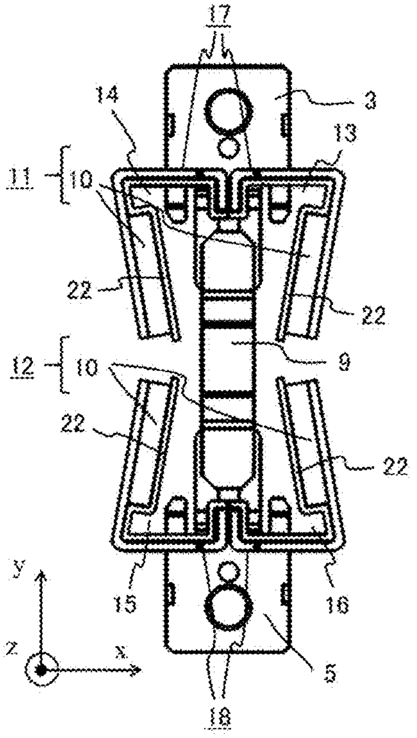
FIG. 17 is a top plan view illustrating the structure of the arc extinguishing chamber of the switch according to the fifth embodiment.

FIGS. 16 and 17 are a perspective view and a top plan view, respectively, illustrating the inside of an arc extinguishing chamber 2 of a switch 1 according to a fifth embodiment. As in the first embodiment, the switch 1 according to the fifth embodiment includes a first stationary contact 3 having a first stationary contact point 4; a second stationary contact 5 having a second stationary contact point 6; a movable contact 9 having a first movable contact point 7 and a second movable contact point 8, which are capable of coming into and out of contact with the first stationary contact point 4 and the second stationary contact point 6, respectively; and a first magnet pair 11 and a second magnet pair 12 disposed with the movable contact 9 therebetween and each having an angle relative to the movable contact 9. The fifth embodiment is different in providing insulating members 22 on the surfaces of the first magnet pair 11 and the second magnet pair 12 facing each other. Components that are the same as those in the first embodiment will be represented by the same reference numerals, and description thereof will not be repeated.

The magnets 10 of the first magnet pair 11 have the surfaces facing each other, i.e, facing the movable contact 9 and having the insulating members 22 provided thereon, as illustrated in FIG. 17. The insulating members 22 may be made of insulating resin such as polyamide with a thickness of about 1 to 2 mm, for example, and the insulating resin may contain a flame retardant. Note that, in the presence of the first yoke pair 17 described above, the insulating members 22 are preferably provided covering the surfaces of the first yoke pair 17 that face the movable contact 9.

In addition, as in the first magnet pair 11, the magnets 10 of the second magnet pair 12 have the surfaces facing each other, i.e., facing the movable contact 9 and having the insulating members 22 provided thereon. Note that, in the presence of the second yoke pair 18 described above, the insulating members 22 are preferably provided covering the surfaces of the second yoke pair 18 that face the movable contact 9.

The insulating members 22 provided on the surfaces of the magnets 10 facing the movable contact 9 prevents the arcs occurring between the contact points from coming into direct contact with the magnets 10, thereby preventing thermal demagnetization caused by contact of high-temperature arcs with the magnets 10. In addition, when the magnets 10 and the yoke pairs are electrically conductive, the insulating members 22 can prevent breakdown of the contact points, the contacts, the permanent magnets, and the yokes caused by contact of arcs with the magnets 10 and the yoke pairs.

Sixth Embodiment

Figure 18:
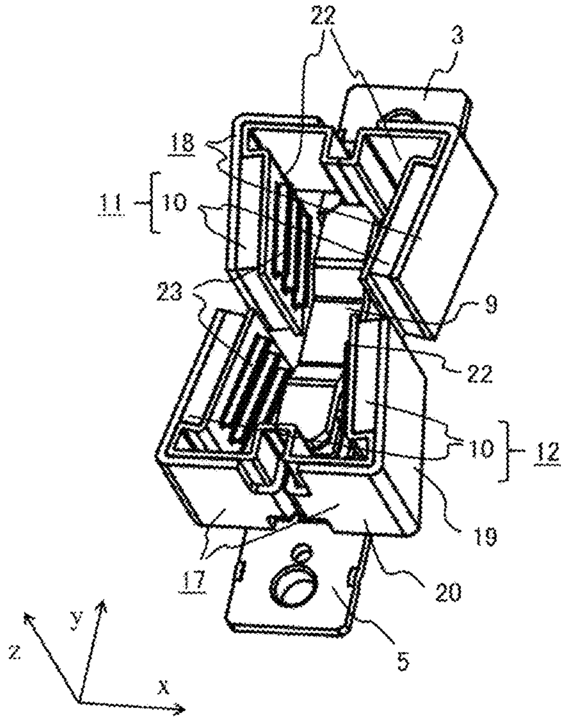
FIG. 18 is a perspective view illustrating a structure of an arc extinguishing chamber of a switch according to a sixth embodiment.
Figure 19:
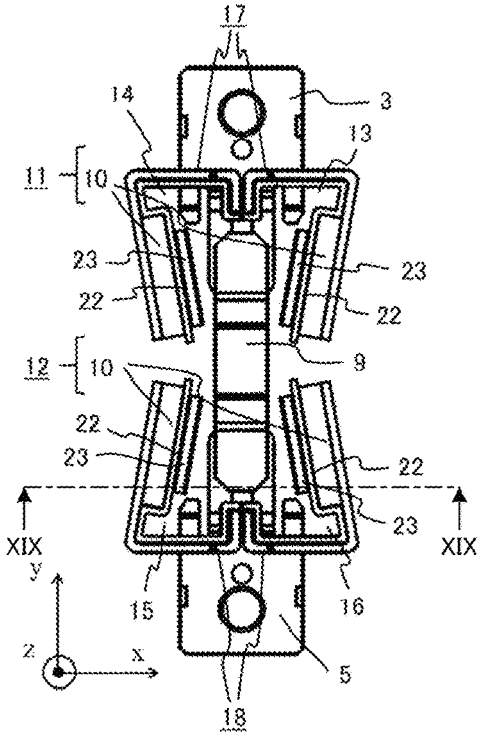
FIG. 19 is a top plan view illustrating the structure of the arc extinguishing chamber of the switch according to the sixth embodiment.

FIGS. 18 and 19 are a perspective view and a top plan view, respectively, illustrating the inside of an arc extinguishing chamber 2 of a switch 1 according to a sixth embodiment. As in the first embodiment, the switch 1 according to the sixth embodiment includes a first stationary contact 3 having a first stationary contact point 4; a second stationary contact 5 having a second stationary contact point 6; a movable contact 9 having a first movable contact point 7 and a second movable contact point 8, which are capable of coming into and out of contact with the first stationary contact point 4 and the second stationary contact point 6, respectively; and a first magnet pair 11 and a second magnet pair 12 disposed with the movable contact 9 therebetween and each having an angle relative to the movable contact 9. The sixth embodiment is different in that insulating members 22 having projections 23 are provided on the surfaces of the first magnet pair 11 and the second magnet pair 12 facing each other. Components that are the same as those in the first embodiment will be represented by the same reference numerals, and description thereof will not be repeated.

The magnets 10 of the first magnet pair 11 have the surfaces facing each other, i.e., facing the movable contact 9 and having the insulating members 22 provided thereon, and the insulating members 22 have the projections 23, as illustrated in FIG. 18. The protections 23 extend in a direction intersecting the direction of extension of arc, that is, the z-axis direction in which the movable contact 9 moves. Note that the direction of extension of the projections 23 is preferably perpendicular to the z axis. In addition, the insulating members 22 may be made of insulating resin such as polyamide with a thickness of about 1 to 2 mm, for example, and the insulating resin may contain a flame retardant. Note that, in the presence of the first yoke pair 17 described above, the insulating members 22 are preferably provided covering the surfaces of the first yoke pair 17 that face the movable contact 9.

In addition, as in the first magnet pair 11, the magnets 10 of the second magnet pair 12 have the surfaces facing each other, i.e., facing the movable contact 9 and having the insulating members 22 are provided thereon, and the insulating members 22 have the projections 23. The projections 23 extend in a direction intersecting the direction of extension of arc, that is, the z-axis direction in which the movable contact 9 moves. Note that the direction of extension of the projections 23 is preferably perpendicular to the z axis. Note that, in the presence of the second yoke pair 18 described above, the insulating members 22 are preferably provided covering the surfaces of the second yoke pair 18 that face the movable contact 9.

The insulating members 22 provided on the surfaces of the magnets 10 facing the movable contact 9 prevents the arcs occurring between the contact points from coming into direct contact with the magnets 10, thereby preventing thermal demagnetization caused by contact of high-temperature arcs with the magnets 10. In addition, when the magnets 10 and the yoke pairs are electrically conductive, the insulating members 22 can prevent breakdown of the magnets 10 and the yoke pairs caused by contact of arcs therewith. Upon contacting the projections 23 formed on the insulating members 22, an arc is drawn longer along the surfaces of the projections 23, which improves the arc extinguishing performance.

While the present embodiment is described giving the example in which the projections 23 are formed at portions of the insulating members 22 that cover the magnets 10, in the presence of the first yoke pair 17 and the second yoke pair 18 covered with the insulating members 22, the projections 23 may be formed on the surfaces of the insulating members 22 that face the movable contact 9. For example, with the projections 23 formed over the entire surfaces of the insulating members 22 facing the movable contact 9, an arc can be drawn to a greater length when contacting the insulating members 22. Alternatively, recesses may be formed on the insulating members 22. Furthermore, both of recesses and the projections 23 may be formed on the insulating members 22.

Seventh Embodiment

Figure 20:
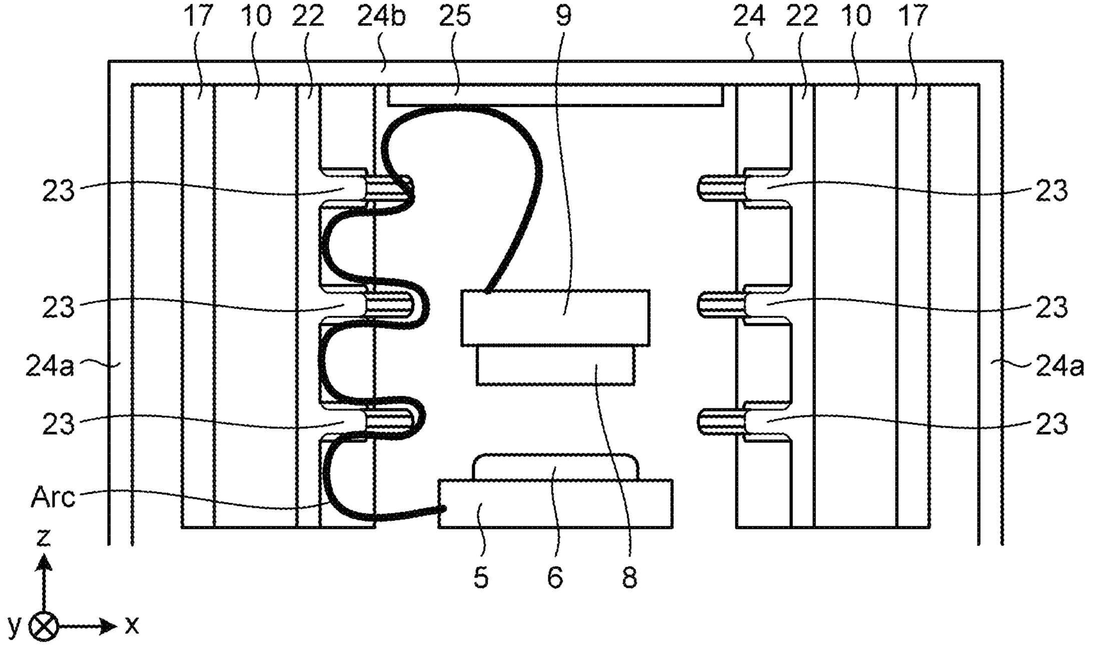
FIG. 20 is a partial cross-sectional view illustrating a structure of an arc extinguishing chamber of a switch according to a seventh embodiment.

FIG. 20 is a partial cross-sectional view illustrating the inside of an arc extinguishing chamber 2 of a switch 1 according to a seventh embodiment. FIG. 20 corresponds to a cross-sectional view taken along line XIX-XIX of FIG. 19, for example. Although FIG. 20 illustrates a cover 24 covering each arc extinguishing chamber 2 of the switch 1 for convenience of explanation of the structure in the seventh embodiment, the shape is not limited to that illustrated. The cover 24 covers a space in which the movable contact 9, the first magnet pair 11, and the second magnet pair 12 are disposed. In one example, the cover 24 is provided in such a manner as to cover planes of a space in x-axis direction, the y-axis direction, and the z-axis direction, the planes being surrounded by the first yoke pair 17 and the second yoke pair 18. In one example, the cover 24 has a hollow rectangular parallelepiped shape that can accommodate therein the first yoke pair 17 and the second yoke pair 18. The cover 24 has side faces 24*a* perpendicular to the x-axis direction, side faces perpendicular to the z-axis direction, and a front face 24*b* perpendicular to the y-axis direction and located on the y-axis positive side.

As in the first embodiment, the switch 1 according to the seventh embodiment includes: a first stationary contact 3 having a first stationary contact point 4; a second stationary contact 5 having a second stationary contact point 6; a movable contact 9 having a first movable contact point 7 and a second movable contact point 8, which are capable of coming into and out of contact with the first stationary contact point 4 and the second stationary contact point 6, respectively; and a first magnet pair 11 and a second magnet pair 12 disposed with the movable contact 9 therebetween and each having an angle relative to the movable contact 9. The switch 1 of the seventh embodiment is different from that in the first embodiment in further including a resin plate 25. Note that components that are the same as those in the first to sixth embodiments will be represented by the same reference numerals, and description thereof will not be repeated.

As illustrated in FIG. 20, the resin plate 25 on an opposite side of the movable contact 9 to the first movable contact point 7 and the second movable contact point 8 is spaced from the movable contact 9. The resin plate 25 is a plate-like member made of thermally degradable polymer, and secured to the front face 24*b* inside the cover 24, for example. Alternatively, the resin plate 25 may be formed integrally with the front face 24*b* of the cover 24. When an arc Arc comes into contact with the resin plate 25, pyrolysis gas is produced from the resin plate 25 by the heat of the arc Arc or the like. The arc Arc is then cooled by the pyrolysis gas.

In addition, the space between the movable contact 9 and the resin plate 25 is an arc drawing space, which is a space for drawing the arc Arc, and the resin plate 25 is therefore preferably as thin as possible so that a sufficient arc drawing space is formed. Furthermore, the resin plate 25 is preferably at a distance of about 3 mm or longer from the projections 23.

Note that FIG. 20 illustrates an example of an arc state in which the arc Arc is drawn into the arc drawing space. While the resin plate 25 described above is provided in the structure discussed in the sixth embodiment, the resin plate 25 may be similarly provided in any of the structures discussed in the first to fifth embodiments.

As described above, the resin plate 25 is installed in the arc drawing space defined on an opposite side of with respect to the movable contact 9 to the first movable contact point 7 and the second movable contact point 8. As a result, when an arc Arc occurring between the contact points is drawn into contact with the resin plate 25, pyrolysis gas is produced from the resin plate 25 by the action of the heat of the arc Arc and the like. The arc Arc is then cooled by the pyrolysis gas from the resin plate 25, which can further increase the performance of interrupting an arc Arc.

Eighth Embodiment

Figure 21:
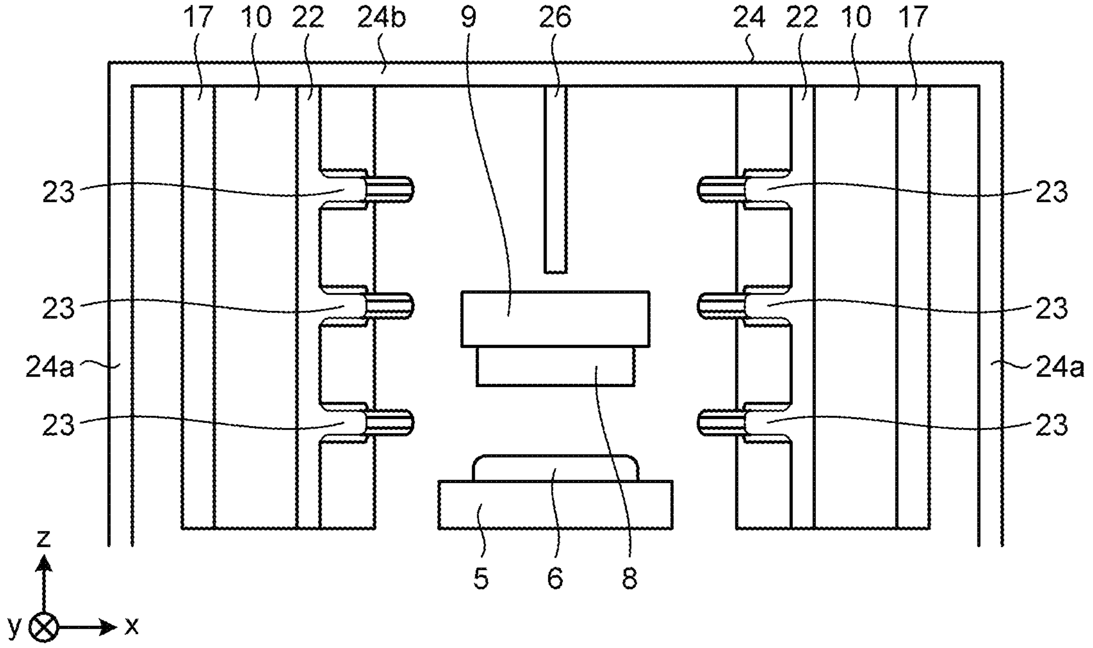
FIG. 21 is a partial cross-sectional view illustrating a structure of an arc extinguishing chamber of a switch according to an eighth embodiment.

FIG. 21 is a partial cross-sectional view illustrating the inside of an arc extinguishing chamber 2 of a switch 1 according to an eighth embodiment. FIG. 21 corresponds to a cross-sectional view taken along line XIX-XIX of FIG. 19, for example. As in the first embodiment, the switch 1 according to the eighth embodiment includes a first stationary contact 3 having a first stationary contact point 4; a second stationary contact 5 having a second stationary contact point 6; a movable contact 9 having a first movable contact point 7 and a second movable contact point 8, which are capable of coming into and out of contact with the first stationary contact point 4 and the second stationary contact point 6, respectively; and a first magnet pair 11 and a second magnet pair 12 disposed with the movable contact 9 therebetween and each having an angle relative to the movable contact 9. The switch 1 of the eighth embodiment is different from that in the first embodiment in further including an insulating plate 26. Note that components that are the same as those in the first to seventh embodiments will be represented by the same reference numerals, and description thereof will not be repeated.

As illustrated in FIG. 21, the insulating plate 26 is a plate-like member extending in the y-axis direction and the z-axis direction. The insulating plate 26 on an opposite side of the movable contact 9 to the first movable contact point 7 and the second movable contact point 8 extends in the y-axis direction. Specifically, the insulating plate 26 is disposed a predetermined interval away from the movable contact 9 in the z-axis direction so that the insulating plate 26 at the center in the x-axis direction of the movable contact 9 extends in a direction parallel to the y-axis direction that is the longitudinal direction of the movable contact 9. In the example of FIG. 21, the insulating plate 26 is disposed substantially perpendicularly to the top face of the movable contact 9, along the longitudinal direction of the movable contact 9. In one example, the insulating plate 26 is made of insulating resin such as polyamide, or insulating resin containing a flame retardant. In one example, the insulating plate 26 has a thickness within a range from 1 mm to 2 mm in the x-axis direction. The insulating plate 26 is secured to the front face 24*b* of the cover 24, for example. Alternatively, the insulating plate 26 and the front face 24*b* of the cover 24 may be formed of the same material integrally with each other.

While the insulating plate 26 described above is provided in the structure discussed in the sixth embodiment, the insulating plate 26 may be similarly provided in any of the structures discussed in the first to fifth embodiments.

Figure 22:
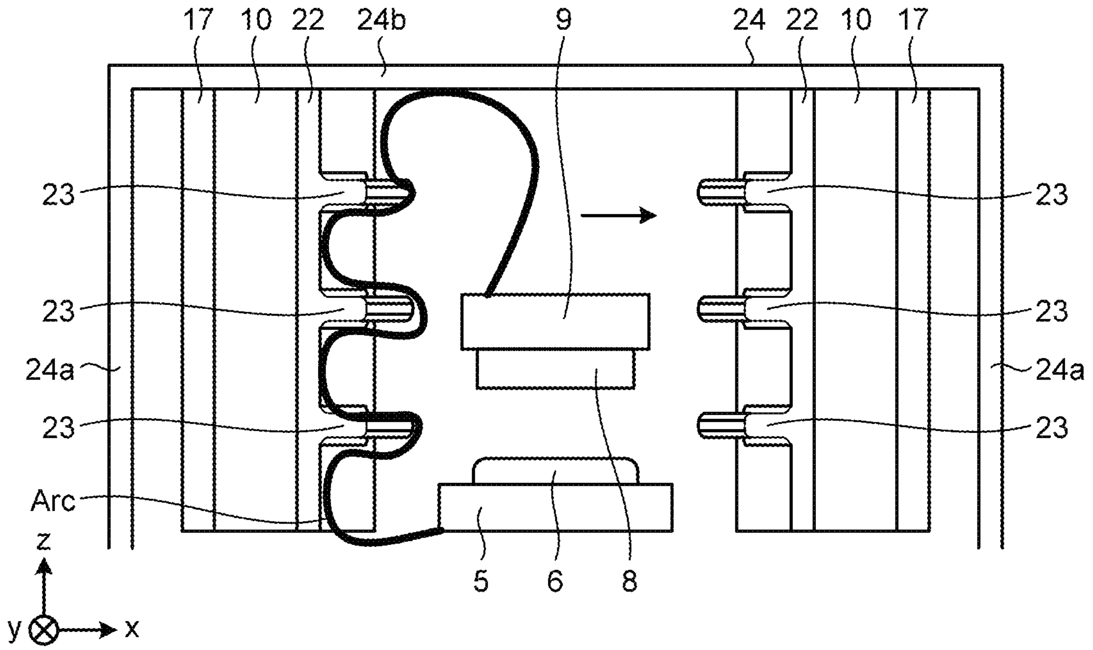
FIG. 22 is a cross-sectional view illustrating an example of an arc discharge state in a switch including no insulating plate.
Figure 23:
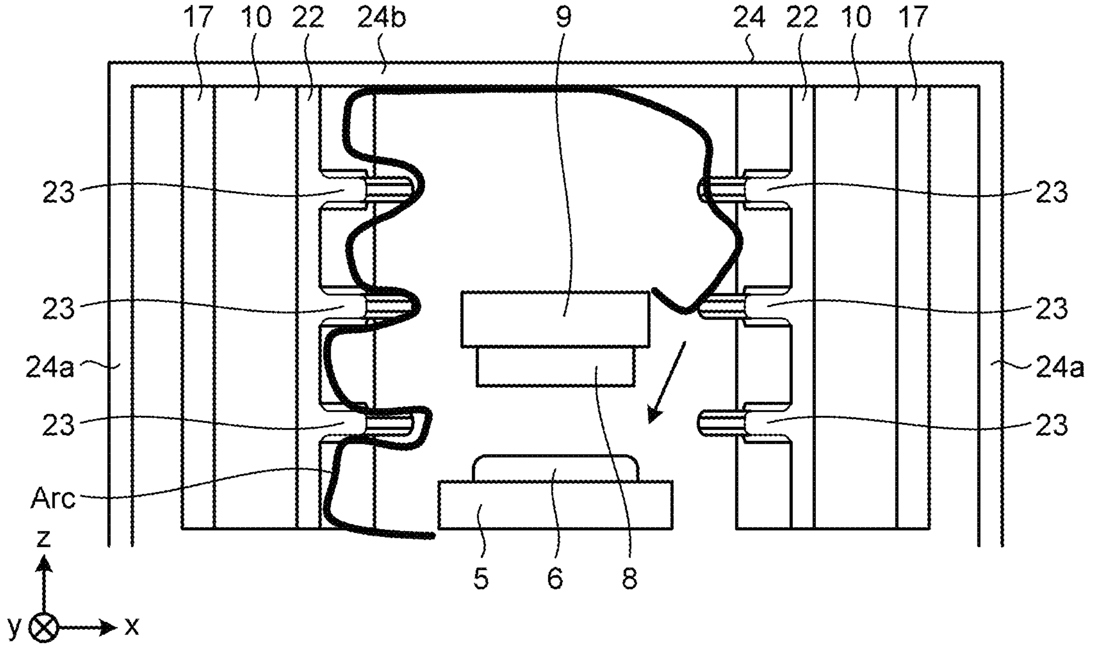
FIG. 23 is a cross-sectional view illustrating an example of an arc discharge state in a switch including no insulating plate.

Effects produced by provision of the insulating plate 26 will now be explained. FIGS. 22 and 23 are cross-sectional views illustrating examples of the state of the arc Arc in the switch 1 not including the insulating plate 26. FIGS. 22 and 23 correspond to cross-sectional views along line XIX-XIX of FIG. 19 in the sixth embodiment, for example. The switch 1 in FIGS. 22 and 23, which is the switch 1 presented in the sixth embodiment, has no insulating plate 26 provided on the front face 24*b* of the cover 24.

As illustrated in FIG. 22, in the absence of the insulating plate 26, arcs Arc occur between the first stationary contact point 4 and the first movable contact point 7 and between the second stationary contact point 6 and the second movable contact point 8. When driven toward the magnets 10, the arcs Arc are drawn by the projections 23 of the insulating members 22. The arcs Arc in the state illustrated in FIG. 22 further move in the x-axis positive direction within the space between the movable contact 9 and the front face 24*b* of the cover 24, as illustrated in FIG. 23. When the current is large, high-temperature gas produced by the arcs Arc is blown between the first stationary contact point 4 and the first movable contact point 7 and between the second stationary contact point 6 and the second movable contact point 8. As a result, the arcs Arc may thus move back between the first stationary contact point 4 and the first movable contact point 7 and between the second stationary contact point 6 and the second movable contact point 8. As described above, the absence of the insulating plate 26 may degrade the arc interruption performance.

Figure 24:
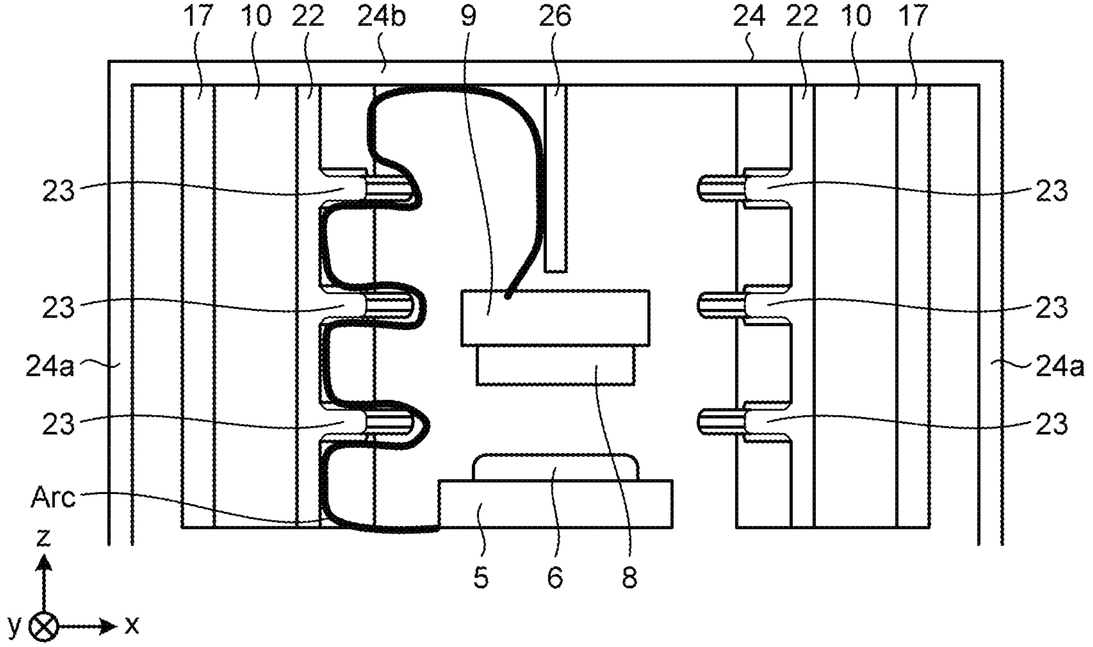
FIG. 24 is a conceptual view explaining effects of the switch according to the eighth embodiment.

FIG. 24 is a cross-sectional view illustrating an example of the state of the arc Arc in the switch 1 according to the eighth embodiment. FIG. 24 corresponds to a cross-sectional view along line XIX-XIX in FIG. 19 of the sixth embodiment, for example. As illustrated in FIG. 24, the switch 1 of the eighth embodiment includes the insulating plate 26 extending in the y-axis direction and the z-axis direction in the space between the movable contact 9 and the front face 24*b* of the cover 24, which limits the movement of the arcs Arc in the x-axis direction. As a result, high arc interruption performance can be maintained.

Note that the movable contact 9 and the insulating plate 26 are preferably installed a predetermined interval away from each other so that the movable contact 9 does not collide with the insulating plate 26 in moving in the z-axis direction. When the interval is too large, unfortunately, the effect of limiting the movement of the arcs Arc is reduced. In view of this, the interval between the movable contact 9 and the insulating plate 26 when the first stationary contact point 4 and the first movable contact point 7 are not in contact with each other and the second stationary contact point 6 and the second movable contact point 8 are not in contact with each other is preferably equal to or smaller than 5 mm.

Ninth Embodiment

Figure 25:
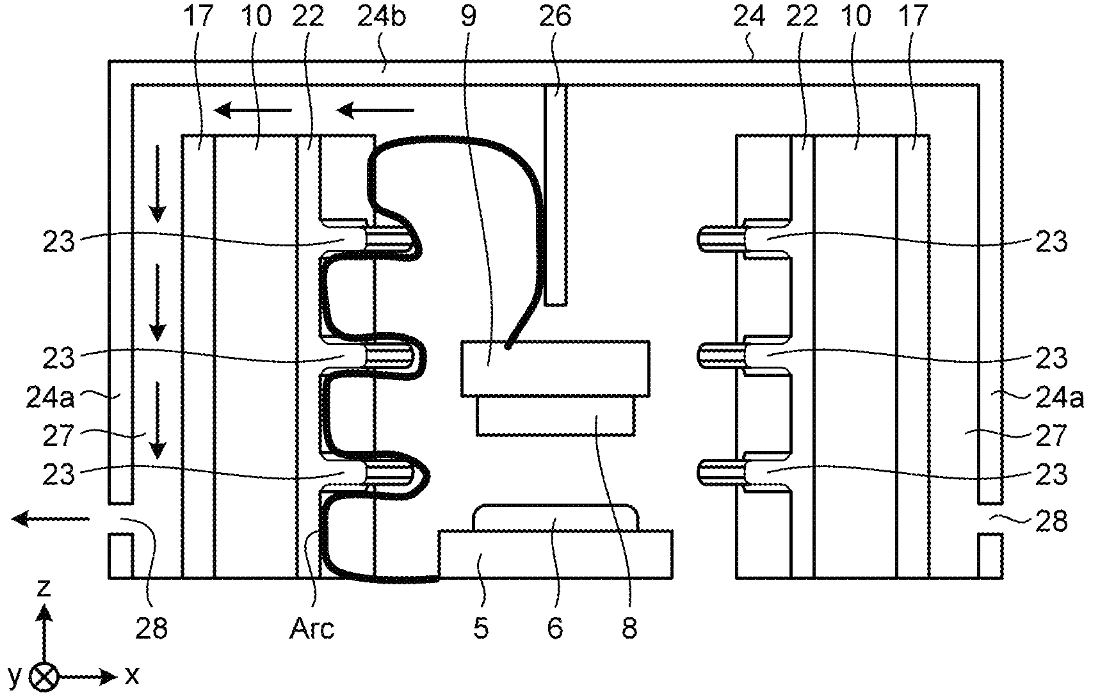
FIG. 25 is a partial cross-sectional view illustrating a structure of an arc extinguishing chamber of a switch according to a ninth embodiment.

FIG. 25 is a partial cross-sectional view illustrating the inside of an arc extinguishing chamber 2 of a switch 1 according to a ninth embodiment. FIG. 25 corresponds to a cross-sectional view along line XIX-XIX of FIG. 19, for example. As in the first embodiment, the switch 1 according to the ninth embodiment includes: a first stationary contact 3 having a first stationary contact point 4; a second stationary contact 5 having a second stationary contact point 6; a movable contact 9 having a first movable contact point 7 and a second movable contact point 8, which are capable of coming into and out of contact with the first stationary contact point 4 and the second stationary contact point 6, respectively; and a first magnet pair 11 and a second magnet pair 12 disposed with the movable contact 9 therebetween and each having an angle relative to the movable contact 9. The switch 1 of the ninth embodiment is different from that in the first embodiment in further including gas passages 27 and discharge ports 28. Note that components that are the same as those in the first to eighth embodiments will be represented by the same reference numerals, and description thereof will not be repeated.

As illustrated in FIG. 25, in one example, discharge ports 28 are formed through the side faces 24*a* of the cover 24. In FIG. 25, the discharge ports 28 are formed through ends of the side faces 24*a* in the z-axis negative direction. While FIG. 25 illustrates an example in which the discharge ports 28 are formed through the side faces 24*a* perpendicular to the x axis, the discharge ports 28 may be formed through side faces perpendicular to the y-axis direction. In addition, while the two discharge ports 28 are formed in the example illustrated in FIG. 25, at least one discharge port 28 may be formed.

The gas passages 27 are formed inside the cover 24 between outer surfaces of the first yoke pair 17 and the second yoke pair 18 and an inner surface of the cover 24, and guides gas along the front face 24*b* and the side face 24*a* inside the cover 24 toward the discharge ports 28. In the example of FIG. 25, the cover 24 is in contact with the ends of the first yoke pair 17 and the second yoke pair 18 on the z-axis negative side, but is not in contact with the ends of the first yoke pair 17 and the second yoke pair 18 on the z-axis positive side. Thus, the gas passage 27 is formed to detour the first movable contact point 7 and the second movable contact point 8 as viewed from the first stationary contact point 4 and the second stationary contact point 6.

Specifically, the gas passages 27 are formed inside the cover 24 as spaces between the side faces 24*a* in the x-axis direction and the first and second yoke pairs 17 and 18. In addition, the gas passages 27 are formed inside the cover 24 as spaces defined by the front face 24*b* of the cover 24, the first yoke pair 17 and the second yoke pair 18, the magnets 10, and the ends of the insulating members 22 on the z-axis positive side. Alternatively, the gas passages 27 may be formed inside the cover 24 as spaces between the side faces in the y-axis direction and the first and second yoke pairs 17 and 18. As described above, the cover 24 is provided in such a manner that the side faces 24*a* in the x-axis direction and the ends of the first yoke pair 17 and second yoke pair 18 in the z-axis positive direction are not in contact with the cover 24.

Gas produced by the arcs Arc flows through the gas passages 27 and out of the cover 24 through the discharge ports 28.

While the gas passages 27 and the discharge ports 28 described above are provided in the structure discussed in the eighth embodiment, the gas passages 27 and the discharge ports 28 may be similarly provided in any of the structures discussed in the first to seventh embodiments. For example, in the case of the structure of the first embodiment, the gas passage 27 is formed inside the cover 24 and between the outer surfaces of the first and second magnet pairs 11 and 12 and the side faces 24*a*. In addition, the cover 24 is in contact with the ends of the first and second magnet pairs 11 and 12 in the height direction of the movable contact 9 on the side on which the first and second stationary contact 3 and 5 are disposed, the cover 24 being not in contact with the ends of the first and second magnet pairs 11 and 12 in the height direction of the movable contact 9 on the side on which the movable contact 9 is disposed.

The gas passage 27 and the discharge ports 28 provided as described above are advantageous in that, when the internal pressure of the cover 24 is increased by gas produced by the arcs Arc, the produced gas is guided to the gas passages 27 and discharged out through the discharge ports 28. This produces driving force that induces the arcs Arc in the direction of draw of the gas. For this reason, it becomes possible to more quickly draw the arcs Arc, and hence improve the interruption performance. In addition, because it is possible to reduce the increase in the internal pressure, the cover 24 is required to have a lower strength than that of a cover not including the gas passages 27 and the discharge ports 28, thereby reducing the cost for manufacture of the switch 1.

Furthermore, the gas passage 27 is formed to detour the first movable contact point 7 and the second movable contact point 8 as viewed from the first stationary contact point 4 and the second stationary contact point 6. As a result, when a foreign substance enters the cover from the outside through the discharge ports 28, for example, it becomes possible to prevent the foreign substance from reaching the vicinity of the first stationary contact point 4, the second stationary contact point 6, the first movable contact point 7, and the second movable contact point 8, thereby improving the reliability of contact between the contact points.

While the examples in which the switch 1 includes first-phase and second-phase arc extinguishing chambers 2 are described in the first to ninth embodiments, the switch 1 may have at least one arc extinguishing chamber 2, and the number of arc extinguishing chambers 2 may be three or more.

In addition, while the examples in which two magnets 10 defining each magnet pair are described in the first to ninth embodiments, three or more magnets 10 may define a magnet pair. In this case, the number of magnets 10 defining a magnet pair on one side of the movable contact 9 is preferably equal to the number of magnets 10 defining a magnet pair on the other side thereof. This results in reduction in bias of the magnetic fields generated near the contact points.

In addition, while the examples in which the first stationary contact 3 is connected with a load and the second stationary contact 5 is connected with a power supply are described in the first to ninth embodiments, the first stationary contact 3 may be connected with a power supply and the second stationary contact 5 may be connected with a load. In this case as well, arcs can be drawn into the arc extinguishing spaces.

The configurations presented in the embodiments above are examples, and can be combined with other known technologies or with each other, or can be partly omitted or modified without departing from the gist.

REFERENCE SIGNS LIST

1 switch; 2 arc extinguishing chamber; 3 first stationary contact; 4 first stationary contact point; 5 second stationary contact; 6 second stationary contact point; 7 first movable contact point; 8 second movable contact point; 9 movable contact; 10 magnet; 11 first magnet pair; 12 second magnet pair; 13 first arc extinguishing space; 14 second arc extinguishing space; 15 third arc extinguishing space; 16 fourth arc extinguishing space; 17 first yoke pair; 18 second yoke pair; 19 connection part; 20 magnetic flux inducing part; 21 protruding portion; 22 insulating member; 23 projection; cover; 24*a* side face; 24*b* front face; 25 resin plate; plate; 26 insulating plate; 27 gas passage; 28 discharge port.

The invention claimed is:

1. A switch comprising:

a first stationary contact having a first stationary contact point;

a second stationary contact having a second stationary contact point, the second stationary contact point being spaced from the first stationary contact in a length direction of the switch;

a movable contact including:

a first movable contact point to come into and out of contact with the first stationary contact point, and a second movable contact point to come into and out of contact with the second stationary contact point, wherein the first movable contact point is at a first end of the movable contact in a longitudinal direction of the movable contact, and the second movable contact point is at a second end of the movable contact in the longitudinal direction of the movable contact;

a first magnet pair defined by first magnets having surfaces of the same poles facing each other in a lateral direction of the movable contact, the first magnets of the first magnet pair including:

midpoint sides located toward a midpoint between the first movable contact point and the second movable contact point and in proximity of the movable contact, wherein the first stationary contact point and the first movable contact point are between the first magnets of the first magnet pair, and wherein, in a top plan view of the switch, the first magnets of the first magnet pair are angled relative to the longitudinal direction of the movable contact; and a second magnet pair defined by second magnets having surfaces of the same poles facing each other in the lateral direction of the movable contact, the second magnets of the second magnet pair including:

midpoint sides located toward the midpoint between the first movable contact point and the second movable contact point and in proximity of the movable contact, wherein the second stationary contact point and the second movable contact point are between the second magnets of the second magnet pair, and wherein, in the top plan view of the switch, the second magnets of the second magnet pair are angled relative to the longitudinal direction of the movable contact.

2. The switch according to claim 1, wherein angles between the first magnets defining the first magnet pair and the longitudinal direction are equal to each other the top plan of the switch, and angles between the second magnets defining the second magnet pair and the longitudinal direction are equal to each other in the top plan of the switch.

3. The switch according to claim 1, further comprising:

a first yoke pair of yokes each including:

a first connection part connected with corresponding one of the first magnets defining the first magnet pair, and a first magnetic flux inducing part bent from the first connection part so as to be closer to the movable contact in the lateral direction of the movable contact; and a second yoke pair of yokes each including:

a second connection part connected with a corresponding one of the second magnets defining the second magnet pair, and a second magnetic flux inducing part bent from the second connection part so as to be closer to the movable contact in the lateral direction of the movable contact.

4. The switch according to claim 3, wherein the first magnetic flux inducing parts of the first yoke pair each have a first protruding portion extending toward the movable contact in the longitudinal direction, and the second magnetic flux inducing parts of the second yoke pair each have a second protruding portion extending toward the movable contact in the longitudinal direction.

5. The switch according to claim 4, wherein the first protruding portions of the first yoke pair are at least partially located between the first stationary contact point and the first movable contact point in a height direction of the movable contact, and the second protruding portions of the second yoke pair are at least partially located between the second stationary contact point and the second movable contact point in the height direction of the movable contact.

6. The switch according to claim 3, wherein the first magnetic flux inducing parts of the first yoke pair are integrally continuous, and the second magnetic flux inducing parts of the second yoke pair are integrally continuous.

7. The switch according to claim 3, wherein the first connection parts of the first yoke pair are contiguous and integral with the second connection parts of the second yoke pair.

8. The switch according to claim 1, wherein at least either of the surfaces of the first magnet pair facing each other and the surfaces of the second magnet pair facing each other is covered with insulating members.

9. The switch according to claim 8, wherein the insulating members have surfaces facing the movable contact, the surfaces of the insulating members each having at least one of a projection and a recess.

10. The switch according to claim 1, further comprising a resin plate made of thermally degradable polymer on an opposite side of the movable contact to the first movable contact point and the second movable contact point, the resin plate being spaced from the movable contact.

11. The switch according to claim 1, further comprising an insulating plate on an opposite side of the movable contact to the first movable contact point and the second movable contact point, the insulating plate being spaced from the movable contact, and the insulating plate extending in the longitudinal direction and a height direction of the movable contact.

12. The switch according to claim 1, further comprising:

a cover covering a space in which the movable contact, the first magnet pair, and the second magnet pair are arranged, wherein the cover includes:

a discharge port; and a gas passage connected with the discharge port, the gas passage being inside the cover and between outer surfaces of the first magnet pair and the second magnet pair and a side face of the cover.

13. The switch according to claim 12, wherein the discharge port is on the side face of the cover on a side on which the first stationary contact and the second stationary contact are arranged in the height direction of the movable contact, and the cover is in contact with ends of the first magnet pair and the second magnet pair in the height direction of the movable contact on a side on which the first stationary contact and the second stationary contact are disposed, the cover being not in contact with ends of the first magnet pair and the second magnet pair in the height direction of the movable contact on a side on which the movable contact is disposed.

14. The switch according to claim 1, wherein, in the top plan view of the switch, first ends of the first magnets of the first magnet pair are at a first distance from each other, and second ends of the first magnets of the first magnet pair are at a second distance from each other less than the first distance, and first ends of the second magnets of the second magnet pair are at a third distance from each other, and second ends of the second magnets of the second magnet pair are at a fourth distance from each other less than the third distance.

* * * * *